Aug. 11, 1931.   J. A. BAKER   1,818,665
WELDING APPARATUS
Filed May 23, 1927   3 Sheets-Sheet 3
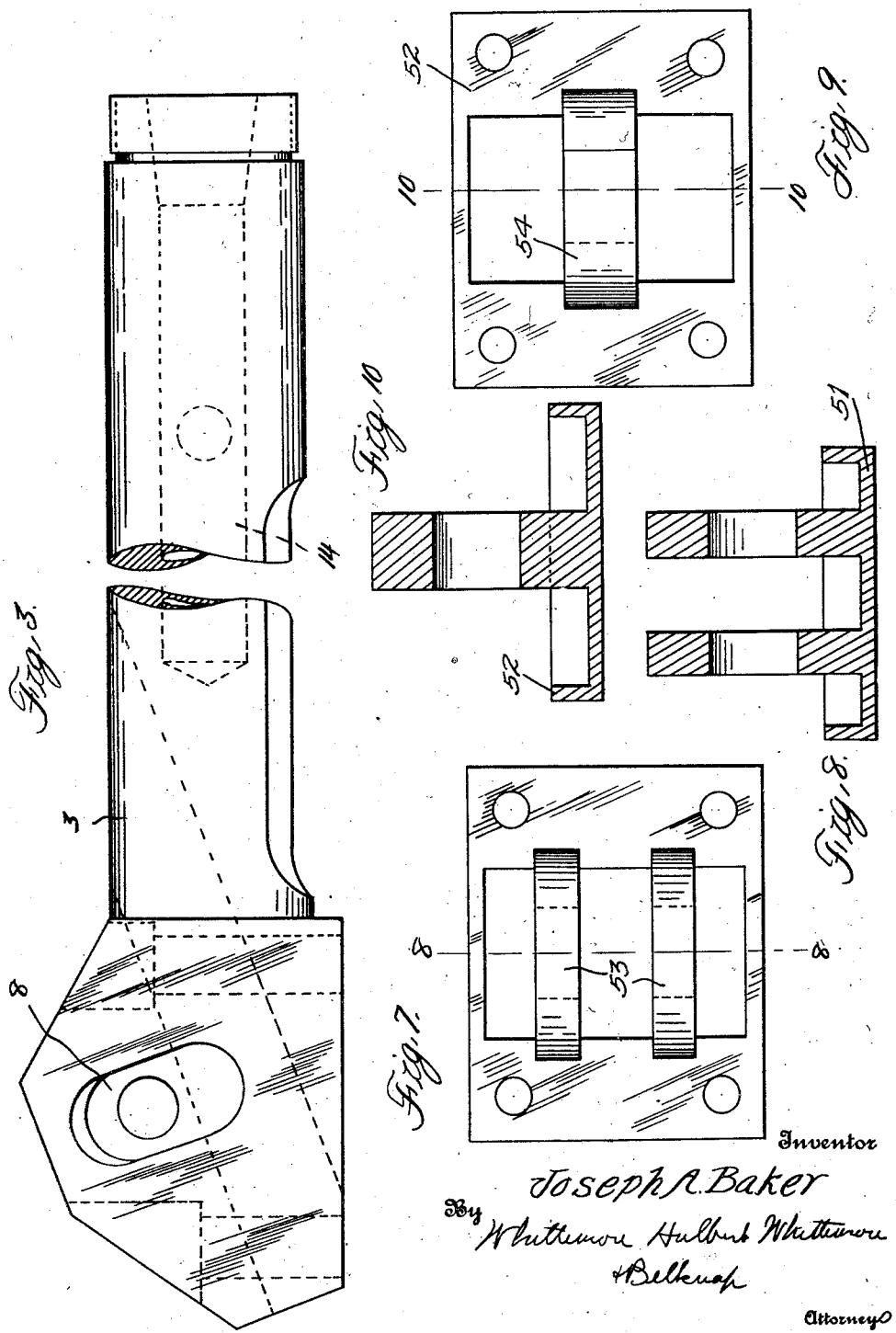

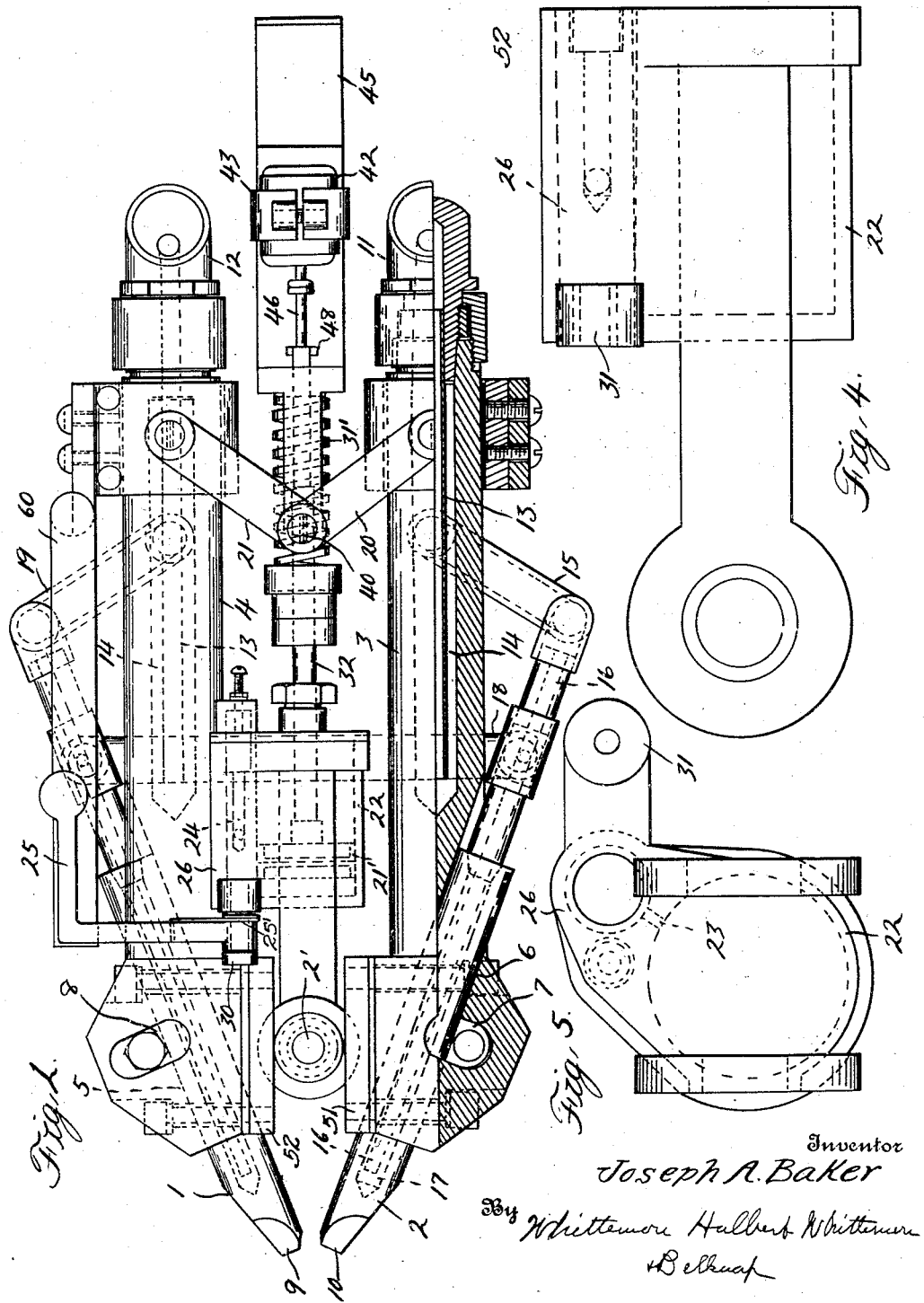

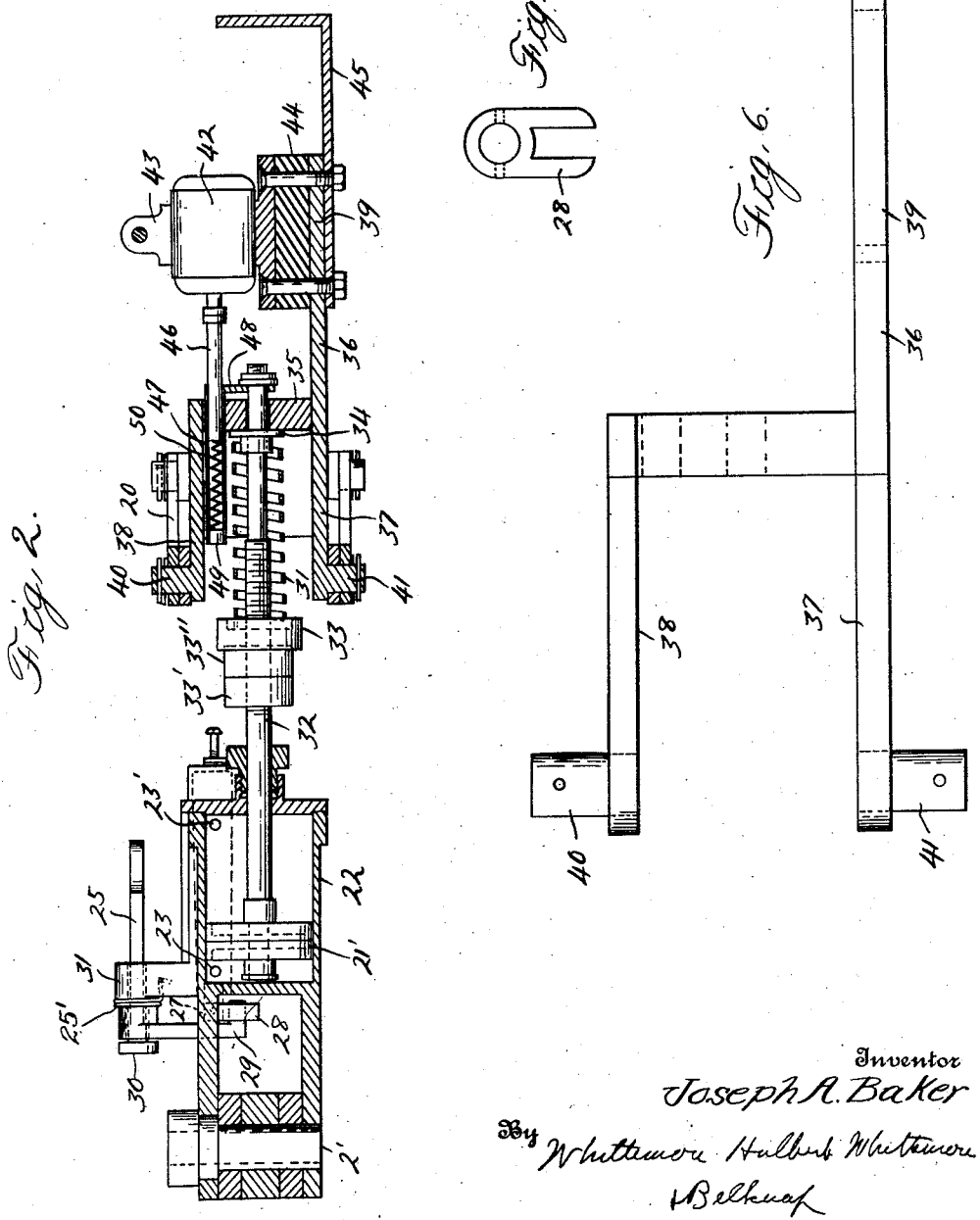

Patented Aug. 11, 1931

1,818,665

UNITED STATES PATENT OFFICE

JOSEPH A. BAKER, OF ROSEVILLE, MICHIGAN, ASSIGNOR, BY MESNE ASSIGNMENTS, TO CHRYSLER CORPORATION, A CORPORATION OF DELAWARE

WELDING APPARATUS

Application filed May 23, 1927. Serial No. 193,668.

This application relates generally to welding apparatus and has for an object the provision of an apparatus capable of being moved about the work to be welded. Another object is to provide an apparatus capable of being handled by one person.

With the above and other objects in view the invention consists in certain novel features of construction, combinations and arrangements of parts as will be more fully described and particularly pointed out in the appended claims.

In the accompanying drawings:

Figure 1 is a top plan view of a welding apparatus embodying my invention and showing parts broken away.

Figure 2 is a longitudinal vertical sectional view through the construction shown in Figure 1.

Figure 3 is a detailed view of one of the copper arms.

Figure 4 is a detailed view of the air cylinder.

Figure 5 is an end elevation of the construction shown in Figure 4.

Figure 6 is a detailed view of a switch bracket.

Figure 7 is a detailed plan view of one of the hinge brackets.

Figure 8 is a sectional view taken on the line 8—8 of Figure 7.

Figure 9 is a detailed view of the cooperating hinge bracket.

Figure 10 is a sectional view taken on the line 10—10 of Figure 9.

Figure 11 is a detailed view of the actuating fork 28.

Referring now to the drawings, 1 and 2 respectively are forwardly converging welding electrodes, and 3 and 4 respectively are hingedly connected supporting arms therefor. As shown, the electrodes 1 and 2 extend through suitable bores 5 and 6 in the arms 3 and 4 and are held firmly therein by means of suitable clamps 7 and 8. The forward ends or welding points 9 and 10 respectively of the electrodes are normally spaced slightly apart as shown in Figure 1 and are adapted to be moved toward each other to engage in the work. The arms 3 and 4 are preferably formed of copper and carry at their rear ends substantially L-shaped tubular fittings 11 and 12 respectively to which the secondary cables are attached and through which cooling water is circulated. Preferably this water flows from the fitting 11 through tube 13 in the arm 3 to the forward end of the longitudinally extending passage 14 therein, thence rearwardly in the passage 14 in the arm and out through a hose 15 to the rear end of the electrode 2. Then the water flows through a tube 16 in the electrode tube to a point adjacent to the welding point 9 thereof, thence rearwardly in the longitudinally extending passage 17 in the electrode 2 and out through a hose 18 to the electrode 1 on the other side of the welder. After leaving the hose 18 the water flows in a reverse direction through the electrode 1, hose 19, arm 4 and fitting 12.

Connecting the arms 3 and 4 adjacent to their rear ends are two toggle bars 20 and 21 which are adapted to be actuated by air operated means for swinging the arms 3 and 4 about their pivot 2' to cause the welding points 9 and 10 of the electrodes to be moved to and from the work.

As shown, the actuating means for the toggle bars comprises a piston 21' that reciprocates in a cylinder 22 extending longitudinally of the median line of the cylinder between the arms 3 and 4, and is adapted to be reciprocated in the cylinder by air supplied to the cylinder 22 through port 23 and 23' at opposite ends thereof. Preferably the passage of air from a suitable source (not shown) through the port 23 and 23' into the cylinder 22 is controlled by a rotary valve 24 that is adapted to be actuated manually by a suitable lever 25. As shown, the valve 24 is mounted in a suitable chamber 26 at one side of the cylinder 22 and has a forward extension 27 carrying a fork 28 that is engaged by a foot portion 29 of the lever 25. This lever is pivoted on a pin 30 carried by an upstanding lug 31 of the cylinder 22. Normally the port 23' in rear of the piston is open so that the piston is maintained in its forward position, however when the lever 25 is depressed the foot portion 29 will cause the fork 28 to rock and thereby rotate the valve 24 so as to close the port 23' and allow air under pressure to enter the cylinder 22 in advance of the piston 21'. This will cause the piston to move rearwardly so that the electrode points will pinch together the work to be welded.

To determine the pressure that will be exerted by the welding points when the piston in the air cylinder has completed its stroke, I have provided a coil spring 31' that is sleeved upon the rearwardly extending piston rod 32 between the abutments 33 and 34, and have provided suitable adjusting nuts 33' and 33'' for regulating this pressure. As shown, the abutment 33 is adjustably mounted on the piston rod 32 between the spring 31' and the adjusting nuts 33' and 33'' and is adapted to move rearwardly with the rod. The abutment 34 is sleeved loosely on the rod 32 and is held by the spring 31' against the vertical intermediate portion 35 of a primary switch bracket 36. Preferably this bracket 36 has vertically spaced substantially parallel arms 37 and 38 projecting forwardly from the upper and lower ends of the intermediate portion 35 and has a substantially horizontal arm 39 projecting rearwardly from the lower end of the intermediate portion 35. In the present instance the forward arms 37 and 38 are provided at their forward ends with vertical lugs 40 and 41 respectively that constitute intermediate pivots for the toggle bars 20 and 21, while the rearward arm 39 constitutes a support for a suitable primary switch 42. Preferably this switch is held by suitable clamp 43 that is insulated by the block 44 from the arm 39. If desired, a substantially L-shaped plate 45 may be secured to the rearward arm 39 to serve as a guard for the switch.

With this construction the switch 42 is actuated automatically by the piston rod 32. As shown, the switch 42 has a forwardly projecting rod 46 that is received in and slidably engaged by a tubular housing or sleeve 47 that in turn is slidably mounted in the intermediate portion 35 of the switch bracket and has a depending projection 48 at its rear end secured to the piston rod 32. A plug 49 is anchored in the forward end of the tubular housing 47, and a light coil spring 50 is located in the housing 47 between the plug 49 and the forward end of the switch rod or plunger 46.

Thus when the port 23 is opened by the valve 24, the piston rod 32 will be moved rearwardly and will carry with it the tubular housing 47. This movement of the housing then causes the coil spring 50 to be compressed until the force exerted by it is sufficient to overcome a spring (not shown) inside of the switch 42. When this occurs, the switch is closed and the current is allowed to flow through the primary of the welding transformer, the secondary current of course flowing simultaneously through the electrodes 1 and 2. However as soon as the operator releases the lever 25, the same will be returned to its normally raised position by means of a spring 25' and the port 23 will be closed while the port 23' will be opened; hence air admitted to the cylinder 22 in rear of the piston 21' will instantly return the piston and rod 32 to normal position. This forward movement of the piston 21' and rod 32 releases the spring 50 and the pressure exerted thereby on the primary switch rod 46, hence the switch 42 opens immediately. With this construction the point at which the switch 42 closes can be regulated by adjusting the plug 49 in the tubular housing 47.

Referring to Figures 7 to 10, the numerals 51 and 52 designate cooperating hinge brackets, the former being carried by the arm 3 and the latter by the arm 4. The bracket 51 is provided with a pair of spaced apertured rings 53 between which the ring 54 of the bracket 52 is adapted to be positioned so that all of the apertures will be in alignment for receiving the hinge bolt 2', this bolt constituting the pivot about which the welding points 9 and 10 swing.

As shown, the welder is too heavy to be carried about easily and is ordinarily suspended by a cable running over pulleys and provided with a counter weight. However, it is light enough to be moved easily from one point to another of, for instance, an automobile body and it can be operated entirely by one man. At the same time it is designed to have sufficient pressure to pinch the parts to be welded firmly together so that satisfactory welds are obtained. Owing to the way in which the controls are arranged, the operator requires only one thumb to operate the valve and is able to hold the machine firmly by two handles such as 60, one of which is provided on each side of the welder. The machine is remarkably powerful for its weight and size and takes the place of massive spot welding machines formerly used for the same class of work. Moreover a considerable saving has been effected by the introduction of these machines since it is found that it is much quicker and cheaper to move the welder from point to point about the vehicle body, than it is to move the body relatively to a fixed welder.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. In a welding apparatus, a pair of welding electrodes arranged to co-operate with each other to effect a welding operation, movable supports for said electrodes, a primary switch disposed between said supports, actuating means for said supports extending therebetween, and actuating means for said switch, including means operatively connected to said first mentioned actuating means.

2. In a welding apparatus, a pair of welding electrodes, movable supporting members therefor, actuating means for said supporting members positioned therebetween, a primary switch, and actuating means for said switch including means extending between said supporting members and actuable by said first mentioned actuating means.

3. In a welding apparatus, a movable welding electrode support, a reciprocating rod movable in a plane substantially parallel to said electrode support, an operating connection between said electrode support and rod, an electric switch in substantial alignment with said rod, and means for connecting said switch to said rod for actuation thereby.

4. In a welding apparatus, a pair of pivotally mounted electrode supporting members, a reciprocating rod between said supporting members, an operating connection between said rod and members, an electric switch in substantial alignment with said rod, and means for connecting said rod and switch whereby said switch will be automatically actuated upon reciprocation of said rod.

5. In an electric welding apparatus, a pair of substantially parallel arms, means pivotally connecting said arms adjacent their forward ends, electrodes carried by the forward ends of said arms, a cylinder arranged between said arms with its axis parallel to the axes of the arms, a piston reciprocable in said cylinder and having a rod movable therewith and extending rearwardly beyond the cylinder, a toggle linkage arranged between and pivotally connected to said arms adjacent the rear ends thereof, means operatively connecting said toggle linkage to said rod whereby reciprocation of said rod will impart pivotal movement to said arms for moving the electrodes into or out of engagement with the work, an electric switch arranged adjacent the path of travel of said rod and adapted to control the circuit to said electrodes, and means for establishing a connection between said rod and switch operative upon reciprocation of said rod to automatically actuate said switch.

6. In an electric welding apparatus, a pair of substantially parallel arms having their forward ends pivotally connected, electrodes carried by the forward ends of said arms, a cylinder positioned between said arms with its axis arranged parallel to the axes of said arms, a piston reciprocable in said cylinder and having a rod movable therewith and extending rearwardly beyond the cylinder, an abutment upon said piston rod, a toggle linkage arranged between and pivotally secured to said arms adjacent the rear ends thereof, a switch bracket slidably mounted upon the free end of said piston rod and having means forming the intermediate pivot of said toggle linkage, a spring surrounding said rod and interposed between said abutment and bracket, an electric switch carried by said bracket and adapted to control the circuit to said electrodes, and means for automatically actuating said switch upon reciprocation of said rod.

7. In an electric welding apparatus, a pair of substantially parallel arms having their forward ends pivotally connected, electrodes carried by the forward ends of said arms, a cylinder positioned between said arms with its axis arranged parallel to the axes of said arms, a piston reciprocable in said cylinder and having a rod movable therewith and extending rearwardly beyond the cylinder, an abutment upon said piston rod, pairs of toggle links having their outer ends pivotally secured to said arms adjacent the rear ends thereof, a combined connecting and bracket member provided with a substantially U-shaped forwardly extending portion having its arms terminating in oppositely directed pivot elements adapted to pivotally connect the inner ends of said toggle links, a coiled compression spring encircling said rod and interposed between said abutment and the base of said U-shaped portion, said combined connecting and bracket member being provided with a rearward extension, an electric switch secured to said rearward extension, and means for automatically actuating said switch upon reciprocation of said rod.

8. In an electric welding apparatus, a pair of substantially parallel arms, electrodes carried by said arms adjacent their forward ends, a cylinder arranged between said arms, and means for pivotally connecting the forward ends of said arms to said cylinder, and operating means for causing pivotal movement of said arms to move the electrodes into and out of pressure engagement with the work comprising a piston reciprocable in said cylinder and having a rod movable therewith and extending rearwardly beyond the cylinder, a pair of toggle links having their outer ends pivoted upon said arms adjacent the rear ends thereof, a connecting member slidable upon the free end of said piston and having means pivotally connecting the inner ends of said arms, an abutment upon said piston rod, and a coiled compression spring surrounding said rod and interposed between said connecting member and said abutment.

9. In an electric welding apparatus, a pair of substantially parallel arms, electrodes carried by said arms adjacent their forward ends, a cylinder arranged between said arms, and means for pivotally connecting the forward ends of said arms to said cylinder, and operating means for causing pivotal movement of said arms to move the electrodes into and out of pressure engagement with the work comprising a piston reciprocable in said cylinder and having a rod movable therewith and extending rearwardly beyond the cylinder, a pair of toggle links having their outer ends pivoted upon said arms adjacent the rear ends thereof, a connecting member slidable upon the free end of said piston and having means pivotally connecting the inner ends of said links, an abutment upon said piston rod, and a coiled compression spring surrounding said rod and interposed between said connecting member and said abutment, said abutment being adjustable to vary the compression of said spring.

10. In an electric welding apparatus, a pair of substantially parallel arms, electrodes carried by the forward ends of said arms, a cylinder arranged between said arms and having a forward extension, means pivotally connecting said extension and the forward ends of said arms, a piston reciprocable in said cylinder and having a rod movable therewith and extending rearwardly beyond the cylinder, a toggle linkage arranged between and pivotally connected to the arms adjacent the rear ends thereof, and means operatively connecting said toggle linkage to said rod whereby reciprocation of said rod will impart pivotal movement to said arms for moving the electrodes into or out of pressure engagement with the work.

11. In an electric welding apparatus, a pair of substantially parallel arms, electrodes carried by the forward ends of said arms, a fluid cylinder arranged between said arms and having a forward extension, means pivotally connecting said extension and the forward ends of said arms, a piston reciprocable in said cylinder and having a rod movable therewith and extending rearwardly beyond the cylinder, a toggle linkage arranged between and connected to the arms adjacent the rear ends thereof, means operatively connecting said toggle linkage to said rod whereby reciprocation of said rod will impart pivotal movement to said arms for moving the electrodes into or out of pressure engagement with the work, and means upon said piston rod for varying the pressure exerted by the electrodes upon the work.

In testimony whereof I affix my signature.

JOSEPH A. BAKER.